United States Patent [19]

Storaasli

[11] Patent Number: 5,127,056
[45] Date of Patent: Jun. 30, 1992

[54] SPIRAL AUDIO SPECTRUM DISPLAY SYSTEM

[76] Inventor: Allen G. Storaasli, 1134 1st Pl., Hermosa Beach, Calif. 90254

[21] Appl. No.: 491,931

[22] Filed: Mar. 12, 1990

[51] Int. Cl.⁵ ............................................. G10L 5/00
[52] U.S. Cl. ..................................... 381/48; 340/732; 324/77 R
[58] Field of Search ................................ 381/41–49; 340/732; 324/77 R

[56] References Cited

U.S. PATENT DOCUMENTS

| | | | |
|---|---|---|---|
| 3,750,056 | 7/1973 | Subramanian | 333/72 |
| 4,802,225 | 1/1989 | Patterson | 381/41 |
| 4,958,164 | 9/1990 | Lewis | 343/749 |

*Primary Examiner*—Emanuel S. Kemeny
*Attorney, Agent, or Firm*—Benman & Collins

[57] ABSTRACT

A spiral audio spectrum display system and technique. A plurality of signals are provided which represent power spectral density of an audio signal as a function of frequency. These signals are transformed to polar coordinates and combined with a fixed spiral reference signal in polar coordinates. The combined signal is displayed to provide a spiral representation of the audio spectrum signal. In specific embodiments, each octave span of the audio signal is displayed as a revolution of the spiral such that tones of different octaves are aligned and harmonic relationships between predominant tones are graphically illustrated. The system and display technique of the present invention allows both pitch and harmonic content of an audio signal to be visually identified.

17 Claims, 6 Drawing Sheets

FIG. 2(a)
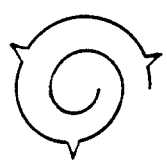
FIG. 2(b)
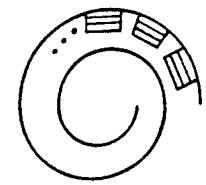
FIG. 2(c)
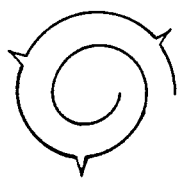
FIG. 2(d)
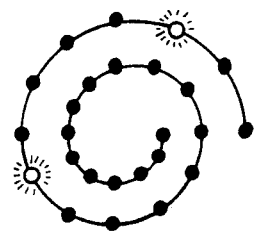
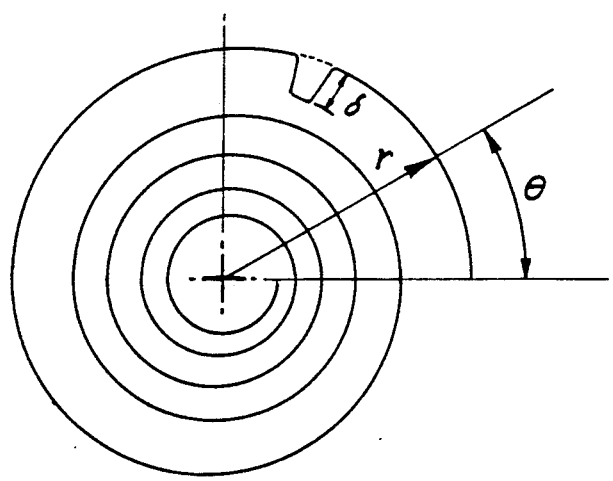
FIG. 3(a)
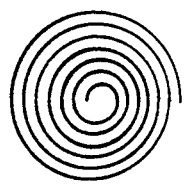
FIG. 3(b)
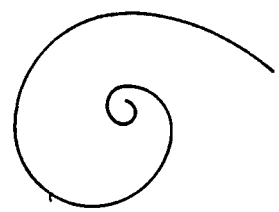
FIG. 3(c)

A7 CHORD

SPIRAL AUDIO SPECTRUM DISPLAY SYSTEM

BACKGROUND OF THE INVENTION

1. Field of the Invention

The present invention relates to display systems. More specifically, the present invention relates to display systems for an audio spectrum.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Spectrum analyzers sample time-varying signals and display the energy content in x - y format as a function of frequency. Typically, the power spectral density of signal is displayed as the ordinate versus frequency as the abscissa. This linear signal representation is suitable for general signal measurement, audio through microwave, where energy content versus frequency information is desired.

However, for audio signals additional manipulation of spectral information may be very useful. Human perception recognizes tonal relationships: pitch of tones, combinations of tones (chords, vocal vowels, etc.), and the variety of miscellaneous sounds in the environment. When audio signals are displayed on a spectrum analyzer, the power spectral density in the signal is represented in a linear fashion. One with a well trained eye might be able to identify certain patterns in a static signal or single frames of a dynamic signal, especially those involving large peaks and valleys. However, it is extremely difficult for the average viewer to recognize pitch and harmonic content in most audio signals, particularly dynamic signals. Pitch and harmonic content from the conventional display can be obtained only by identifying the specific frequencies, then performing tasks including looking up pitch tables and performing mathematic operations to establish intervals between the frequencies.

Pitch and harmonic content recognition capability could aid in speech training for the hearing impaired by providing good visual display of vocal sounds to be imitated by the trainee. This capability could also have application in voice recognition, synthetic speech, electronic music, graphic equalizers and general electronic entertainment.

Accordingly, there is a need in the art for a system and technique for displaying the power spectral density of audio signals to facilitate the recognition of pitch and harmonic content therein.

SUMMARY OF THE INVENTION

The need in the art is addressed by the present invention which provides a spiral audio spectrum display system and technique. A plurality of signals are provided which represent power spectral density of an audio signal as a function of frequency. These signals are transformed to polar coordinates and combined with a spiral signal in polar coordinates. The combined signal is displayed to provide a spiral representation of the audio signal.

In specific embodiments, each octave span of the audio signal is displayed as a revolution of the spiral such that tones of different octaves are aligned and harmonic relationships between predominant tones are graphically illustrated.

The system and display technique of the present invention allows both pitch and harmonic content of an audio signal to be visually identified.

BRIEF DESCRIPTION OF THE DRAWINGS

FIG. 2(a) is illustrative of the output provided by a CRT type display in operation in a system constructed in accordance with the present teachings.

FIG. 2(b) is illustrative of the output provided by an LED or or LCD type display in a system constructed in accordance with the present teachings.

FIG. 2(c) is illustrative of the output provided by an fiber optic bundle type display in a system constructed in accordance with the present teachings.

FIG. 2(d) is illustrative of the output provided by an LED type display driven so that the power spectral density of an input signal modulates the intensity thereof in a system constructed in accordance with the present teachings.

FIG. 3(a) is illustrative of the spiral audio display provided by the system of the present invention.

FIG. 3(b) illustrates the tight spirals resulting from an absolute value of a $|a| << 0.05$.

FIG. 3(c) illustrates the loose spirals resulting from a $|a| >> 0.05$.

DESCRIPTION OF THE INVENTION

Illustrative embodiments and exemplary applications will now be described with reference to the accompanying drawings to disclose the advantageous teachings of the present invention.

Figure 1:
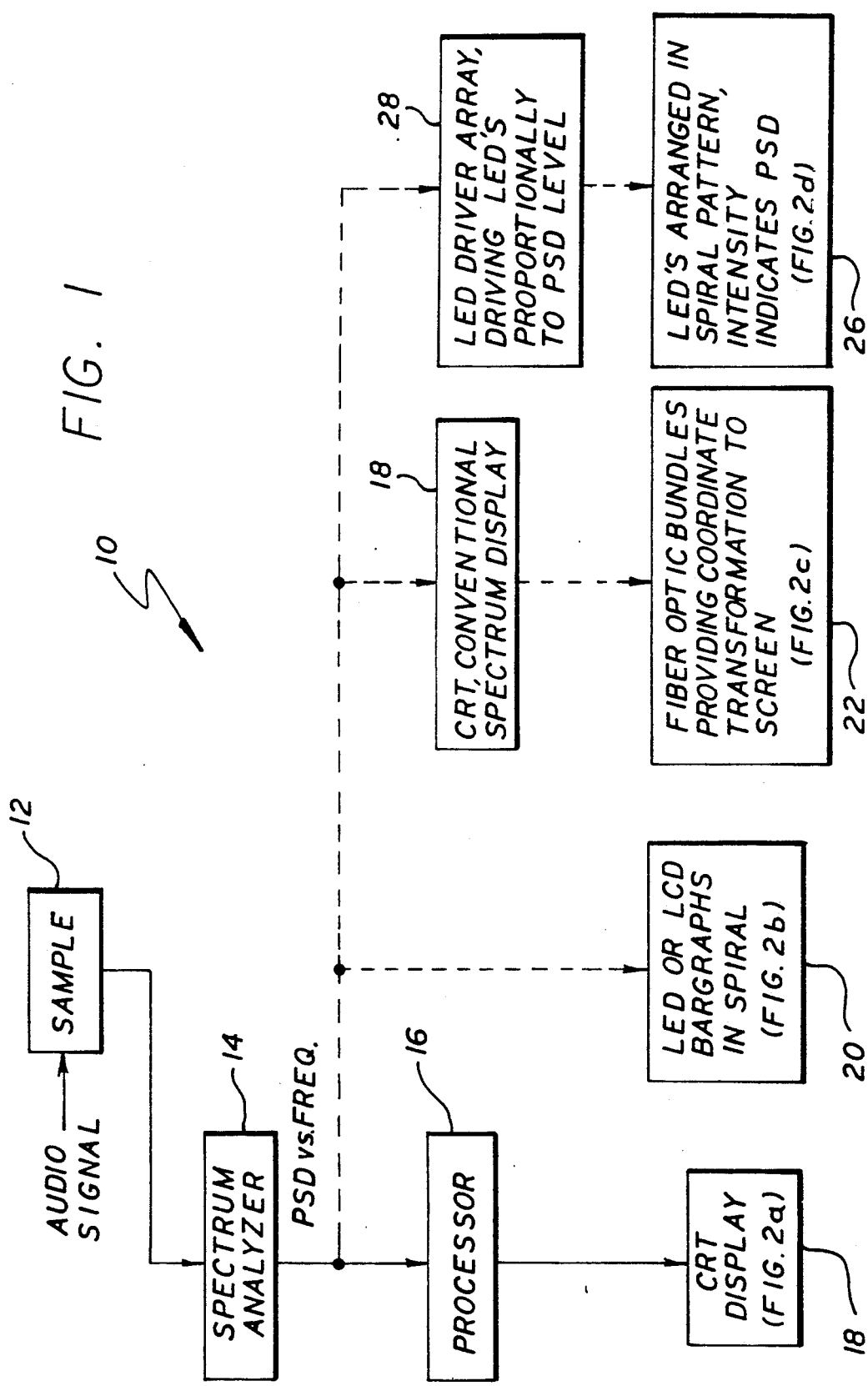
FIG. 1 is a block diagram of an illustrative embodiment of the present invention.

FIG. 1 is a block diagram of an illustrative embodiment of the present invention. The system 10 includes a sampling circuit 12 which provides digitized samples of an input audio signal to a conventional spectrum analyzer 14. The spectrum analyzer 14 outputs a plurality of signals representing the power spectral density (PSD) of the audio signal as a function of frequency. (Output directly to CRT display 18 is typical implementation of conventional linear spectrum analyzers.) These signals are output to a processor 16 which transforms the signals to a spiral format and scales the signals accordingly. As part of the transformation process, the signals are combined with the polar coordinate representation of a spiral such that when the combined signals are displayed as by a CRT 18, the audio signal is illustrated in spiral form as illustrated in FIG. 2(a).

A number of alternative output options are provided in FIG. 1 by a plurality of LED or LCD bar graphs 22 arranged in spiral form, a plurality of fiber optic bundles 22 providing coordinate transformation to a screen from a CRT or conventional spectrum display 24, or a plurality of LEDs 26 arranged in a spiral pattern with intensity indicating PSD. The last embodiment would utilize an LED driver array 28 which would drive the LEDs proportionally to input PSD level. FIGS. 2(b)-2(d) represent the outputs resulting from each of the alternative embodiment display arrangements mentioned above.

FIG. 3(a) is illustrative of the spiral audio display provided by the system of the present invention. The spiral audio display is basically of the form:

$$r = r_o e^{a\Theta} \qquad [1]$$

where r is the radial position and $\Theta$ is the angular position of each coordinate in the graph, $r_o$ is an arbitrary scaling constant, and a is a constant controlling the relative spacing of the loops. Variations on this format (other spiral formulae) can also be used. The variable $\Theta$ has a range of zero to $2\pi n$ where n equals the number of octaves to be displayed. As seen in equation [2] below, $\Theta$ is proportional to the log of the frequency of the audio signal:

$$\Theta = K^* \log(f/f_1) \qquad [2]$$

such that doubling the frequency increases $\Theta$ by $2\pi$ radians, causing one revolution of the spiral. In equation [2], $K = n/2\pi$, f is the frequency of the input audio signal, and $f_1$ represents the lower frequency limit.

Figure 4:
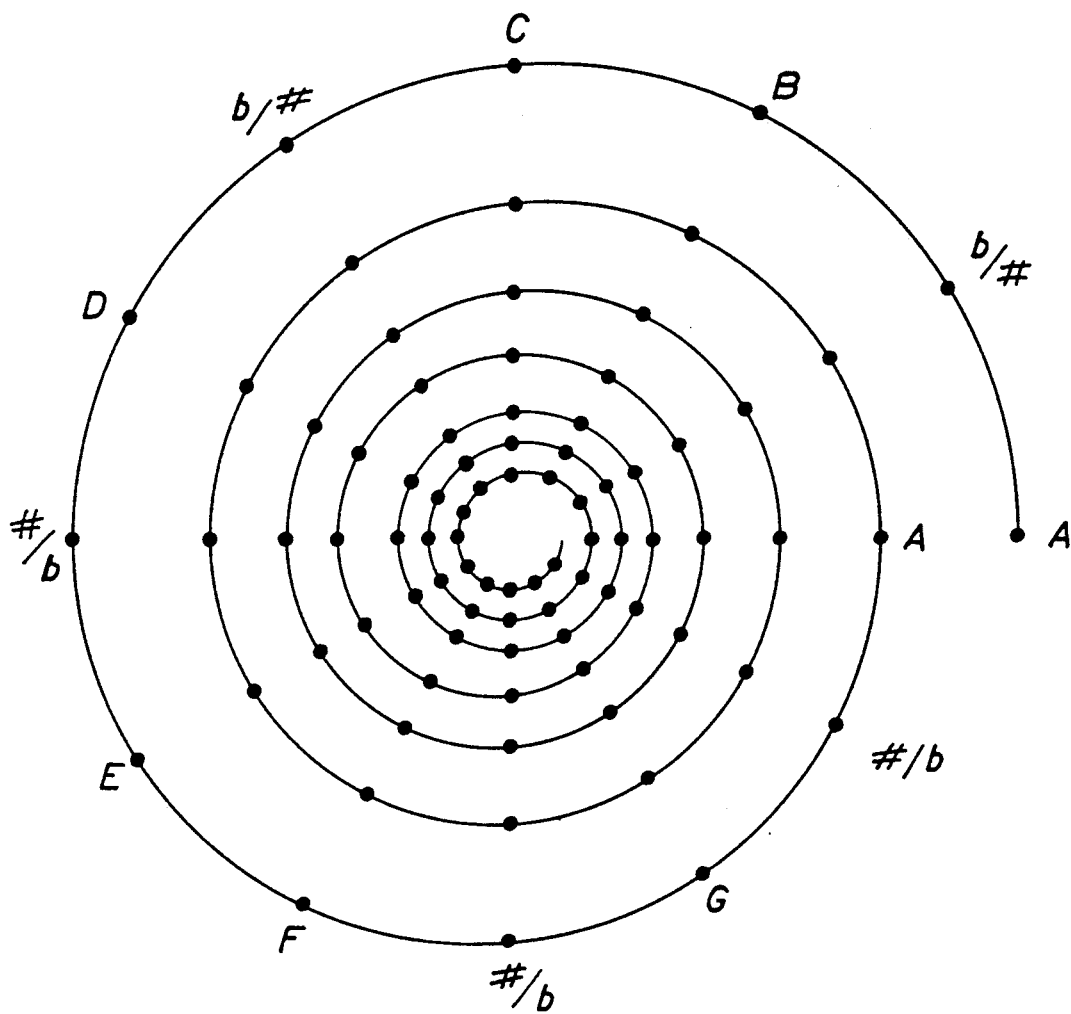
FIG. 4 illustrates a display with musical tone designations.
Figure 7A:
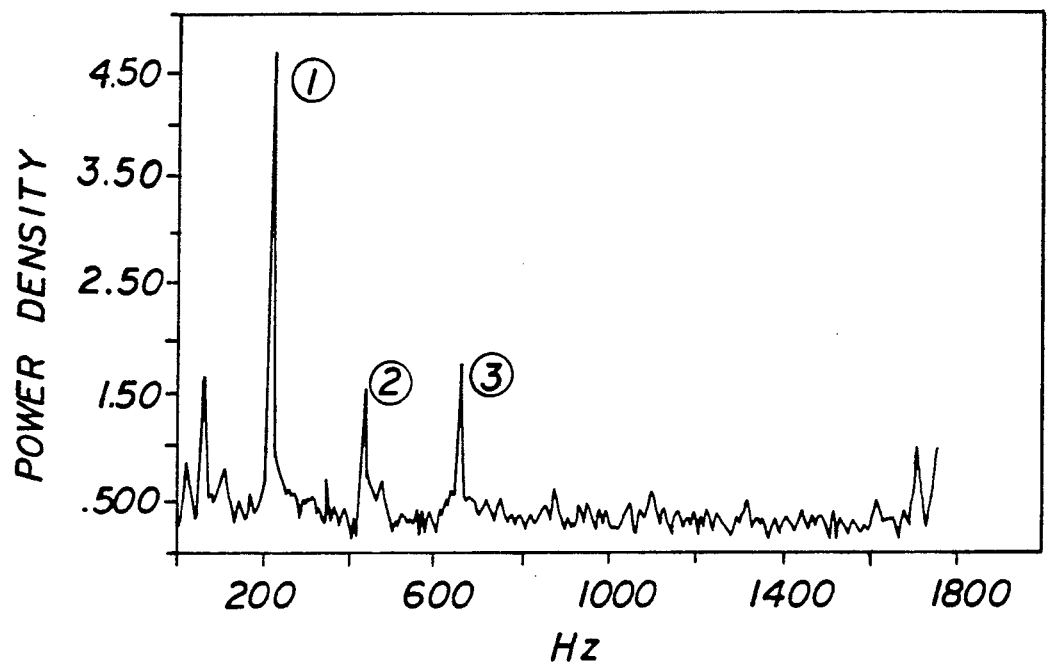
FIG. 7(a) is a conventional spectrum of a plucked guitar A string.
Figure 7B:
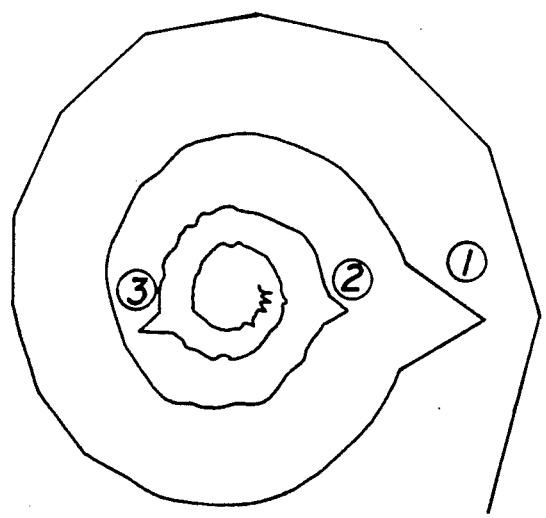
FIG. 7(b) is a spiral spectrum of a plucked guitar A string in accordance with the present teachings.

Returning to equation [1], the constant a controls the relative spacing of the spiral loops. A value of $a \cong -0.05$ produces a spiral going inward for increasing frequency, with spacing suitable to show approximately 5 octaves without crowding or spiraling in too quickly. FIG. 3(b) illustrates the tight spirals resulting from an absolute value of a $|a| << 0.05$. FIG. 3(c) illustrates the loose spirals resulting from a $|a| >> 0.05$. FIG. 4 illustrates a display with musical tone designations. Hence, a basic spiral of the form shown in FIG. 4 is stored in a memory (not shown) in the processor 16. This signal is combined with signals representing the power spectral density of the input audio signal in polar coordinates.

Function P(freq) is the calculated power spectral density as a function of frequency output by the spectrum analyzer 14 with appropriate magnitude scaling (such as log or fractional power of the spectral density) to keep the information both on-scale and visible for the octaves to be displayed.

To add the PSD information to the basic spiral, the spiral radius is locally increased (or decreased) proportionally to the PSD at each angle $\Theta$ (corresponding to frequency (eq.2)). So the radius r' with PSD content is:

$$r' = r_o e^{-0.05\Theta} \pm P(\Theta) \qquad [3]$$

Thus, a spiral audio spectrum display system 10 is provided comprising: a spectrum analyzer 14 for providing a plurality of signals representing power spectral density of an audio signal as a function of frequency; coordinate transformation means 16 for transforming the plurality of signals to polar coordinates and for combining the polar transformed power spectral density signals with a spiral signal in polar coordinates; and a display 18 for displaying the combined signals to provide a spiral representation of an input audio signal. The spectrum analyzer 14 may be implemented as a Fourier Transform or Fast Fourier Transform filter or analog sweeping filter. The processor 16 may be implemented with an analog processor or a digital microprocessor.

Displays 20 and 22 provide the spiral format by physical arrangement of display elements (20 or fiber optic manipulation (22).

As an alternative, the display 26, 28 may provide a spiral with brightness modulated by the spectral amplitude of the audio signal. The physical arrangement of the display elements provides the spiral form.

Figure 5:
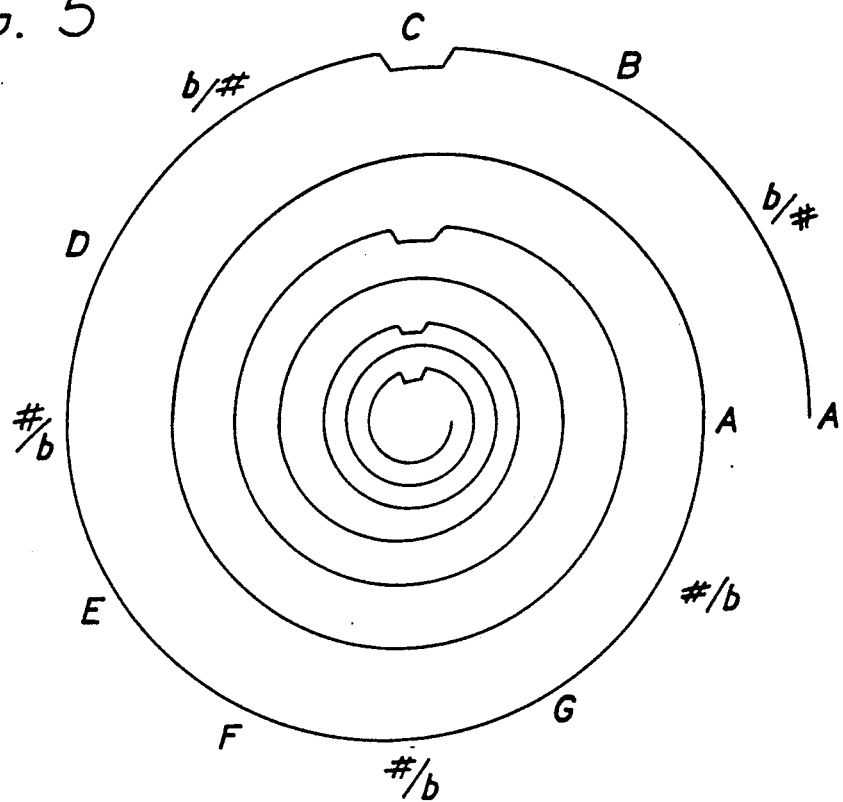
FIG. 5 shows odd harmonics indicative of a square wave in the spiral form afforded by the present invention.
Figure 6:
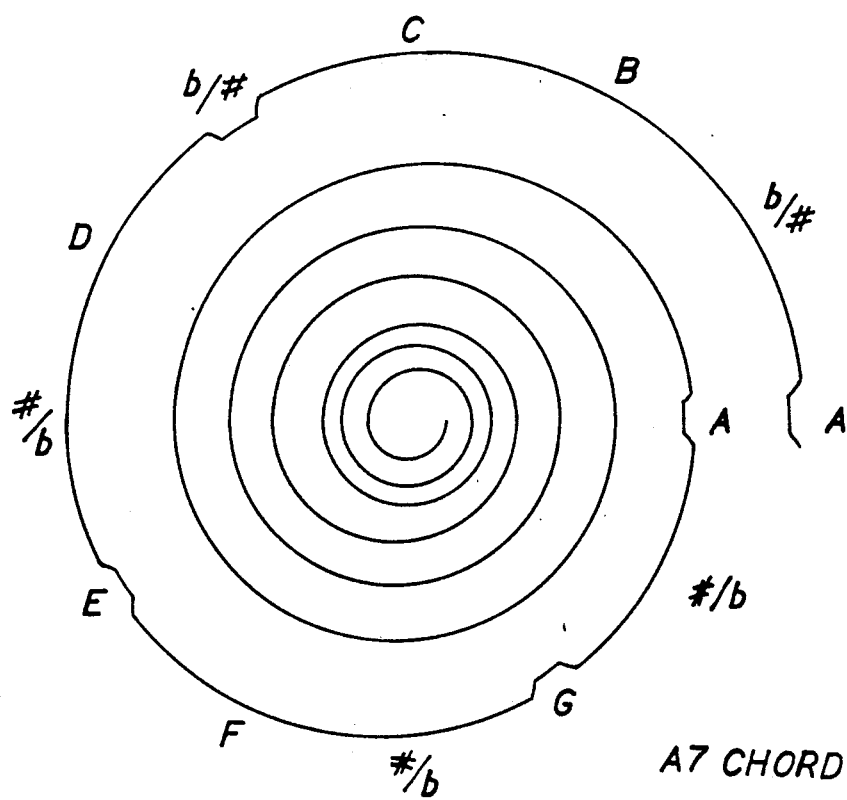
FIG. 6 is spiral representation of an A7 chord.
Figure 8A:
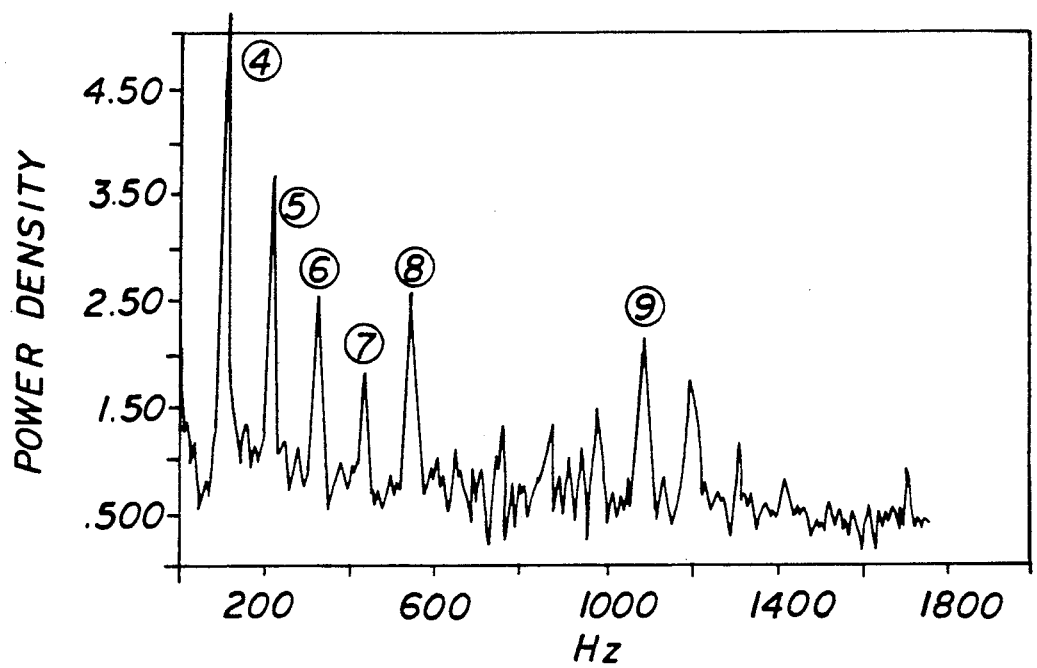
FIG. 8(a) is a conventional spectrum of a vocal "ah", 110 Hz.
Figure 8B:
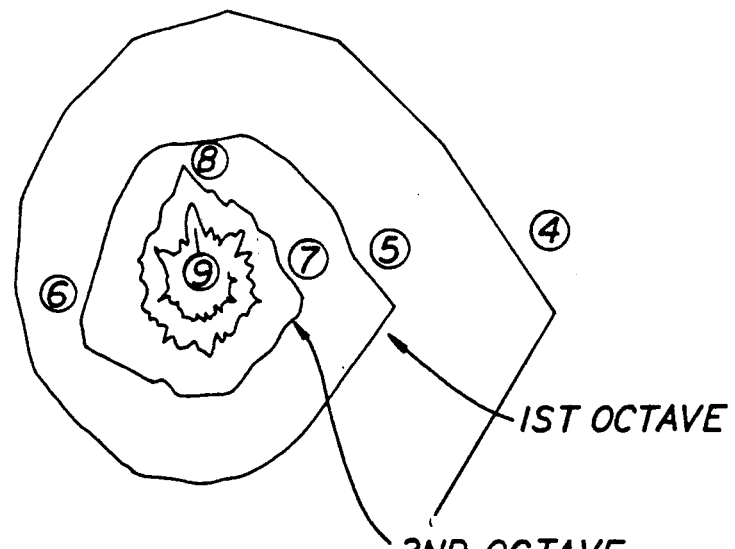
FIG. 8(b) is a spiral representation of the spectrum of the vocal "ah" of FIG. 8(a).

FIGS. 5-8(b) are illustrative of the tonal relationships observable with the spiral outputs provided by the system and method of the present invention. FIG. 5 shows odd harmonics indicative of a square wave in the spiral form afforded by the present invention. FIG. 6 is spiral representation of an A7 chord. FIG. 7(a) is a conventional spectrum of a plucked guitar A string. FIG. 7(b) is a spiral spectrum of a plucked guitar A string in accordance with the present teachings. (7(a) and 7(b) are from the same data sample.) Note the alignment of the harmonic in the spiral representation. The spiral form is relative while the conventional form is absolute in nature. FIG. 8(a) is a conventional spectrum of a vocal "ah", 110 Hz. FIG. 8(b) is a spiral representation of the spectrum of the vocal "ah" of FIG. 8(a). Notice, once again, the alignment of the octaves, the overtones and etc. Those skilled in the art will be able to appreciate the relative ease with which the pitch and harmonic content of the signal may be recognized with the teachings of the present invention.

Thus, the present invention has been described herein with reference to a particular embodiment for a particular application. Those having ordinary skill in the art and access to the present teachings will recognize modifications, applications and embodiments within the scope thereof.

It is therefore intended by the appended claims to cover any and all such applications, modifications and embodiments within the scope of the present invention.

Accordingly,

What is claimed is:

1. A spiral audio spectrum display system comprising:
    transform means for providing a plurality of signals representing power spectral density of an audio signal as a function of frequency;
    coordinate transformation means for transforming said plurality of signals to polar coordinates;
    means for combining said polar transformed power spectral density signals with a spiral signal in said polar coordinates; and
    means for displaying said combined signals to provide a spiral representation of said audio signal, said display means including means for displaying each octave span of said audio signal as a revolution of the spiral.

2. The invention of claim 1 wherein said transform means is a Fourier Transform filter.

3. The invention of claim 1 wherein said transform means is a Fast Fourier Transform filter.

4. The invention of claim 1 wherein said coordinate transformation means is microprocessor.

5. The invention of claim 1 wherein said means for combining said polar transformed power spectral density signals with a spiral signal in said polar coordinates includes first memory means for storing said spiral signals.

6. The invention of claim 1 wherein said display means includes means for displaying the spectral amplitude of said audio signal as a radial deviation of said spiral.

7. The invention of claim 1 wherein said display means includes means for displaying the spectral amplitude of said audio signal as increased brightness of said spiral.

8. The invention of claim 1 wherein said display means includes means for displaying said audio signal as a spiral in which tones of different octaves are aligned.

9. The invention of claim 1 wherein said display means includes means for graphically showing harmonic relationships between predominant tones.

10. A method for displaying an audio signal as a spiral including the steps of:
    a) providing a plurality of signals representing power spectral density of an audio signal as a function of frequency;
    b) transforming said plurality of signals to polar coordinates;
    c) combining said polar transformed power spectral density signals with a spiral signal in said polar coordinates; and
    d) displaying said combined signals to provide a spiral representation of said audio signal, further including the steps of,
        i) displaying each octave span of said audio signal as a revolution of the spiral such that tones of different octaves are aligned and
        ii) graphically showing harmonic relationships between predominant tones.

11. The invention of claim 10 including the step of displaying the spectral amplitude of said audio signal as a radial deviation of said spiral.

12. The invention of claim 11 including the step of displaying the spectral amplitude of said audio signal as increased brightness of said spiral.

13. A method for displaying an audio signal as a spiral including the steps of:
    a) providing a plurality of signals representing power spectral density of an audio signal as a function of frequency;
    b) transforming said plurality of signals to polar coordinates;
    c) combining said polar transformed power spectral density signals with a spiral signal in said polar coordinates; and
    d) displaying said combined signals to provide a spiral representation of said audio signal wherein each octave span of said audio signal is displayed as a revolution of the spiral.

14. The invention of claim 13 including the step of displaying the spectral amplitude of said audio signal as a radial deviation of said spiral.

15. The invention of claim 13 including the step of displaying the spectral amplitude of said audio signal as increased brightness of said spiral.

16. The invention of claim 13 including the step of displaying said audio signal as a spiral in which tones of different octaves are aligned.

17. The invention of claim 13 including the step of graphically showing harmonic relationships between predominant tones.

* * * * *